(12) United States Patent  (10) Patent No.: US 9,347,372 B2
Spohn et al.  (45) Date of Patent: May 24, 2016

(54) METHOD FOR DETERMINING BELT LIFE

(71) Applicant: GM GLOBAL TECHNOLOGY OPERATIONS LLC, Detroit, MI (US)

(72) Inventors: Brian L. Spohn, Holly, MI (US); Todd M. York, Highland, MI (US); Brenton J. Bergkoetter, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/485,677

(22) Filed: Sep. 13, 2014

(65) Prior Publication Data

US 2016/0076442 A1 Mar. 17, 2016

(51) Int. Cl.
*G01M 17/00* (2006.01)
*F02B 77/08* (2006.01)
*F16H 57/01* (2012.01)
*F02B 67/06* (2006.01)

(52) U.S. Cl.
CPC ............... *F02B 77/081* (2013.01); *F02B 67/06* (2013.01); *F16H 57/01* (2013.01); *F16H 2057/014* (2013.01)

(58) Field of Classification Search
CPC ....... F02B 77/08; F02B 77/083; F02B 77/081
See application file for complete search history.

(56) References Cited

U.S. PATENT DOCUMENTS

2005/0192142 A1* 9/2005 Stone ...................... F01L 1/024
474/101

* cited by examiner

*Primary Examiner* — Michael D Lang

(57) ABSTRACT

A control module-implemented method for estimating an end of life a belt transferring torque between at least two rotating members of a belt drive system includes monitoring a plurality of belt parameters during a life cycle of the belt and determining an instantaneous damage factor of the belt based on the plurality of belt parameters. The end of life of the belt is estimated based on the instantaneous damage factor.

19 Claims, 5 Drawing Sheets

METHOD FOR DETERMINING BELT LIFE

TECHNICAL FIELD

This disclosure is related to estimating an end of life of a power transmission belt for transferring torque between two rotating members of a belt drive system.

BACKGROUND

The statements in this section merely provide background information related to the present disclosure. Accordingly, such statements are not intended to constitute an admission of prior art.

Powertrain systems may utilize autostopping strategies to shutdown an engine when a vehicle is stopped in order to improve fuel economy and emissions due to the engine not operating fueled to maintain an idle speed while stopped. When vehicle motion is desired, the engine can be automatically started to provide motive torque to the drive wheels. For instance, the engine may be stopped when the vehicle is at a stop light and automatically started once an operator of the vehicle releases a brake pedal. Electric machines, e.g., electric starter motors, are utilized to crank the engine of the powertrain system during engine start events. A power transmission belt, such as a serpentine belt guided by an idler pulley and belt tensioner, can be utilized to rotatably couple a crankshaft of the engine to the electric machine for transferring torque therebetween. Accordingly, the electric machine may also function as an alternator utilizing torque from the engine for powering electronic applications of the vehicle. Moreover, accessory components may be powered utilizing torque provided from the engine and/or the electric machine via the power transmission belt. Accessory components can include, but are not limited to, a power steering pump device, a water pump device, and an air conditioning compressor device. The accessory components may also be driven directly off of the crankshaft of the engine utilizing one or more additional belts.

It is known, to assign a useful life of a power transmission belt transferring torque between two or more rotating members wherein the vehicle owner is required to replace or have the belt serviced when the useful life has lapsed. Lapsing of the useful life, e.g., the end of life, may be determined upon an occurrence of a predetermined vehicle condition. The predetermined condition can include, but is not limited to, a predetermined number of elapsed belt revolutions since a beginning of life of the belt, a predetermined distance traversed by the vehicle, or a predetermined engine operating time. For instance, the end of life of the belt may be reached upon the vehicle attaining 75,000 miles. Generally, the useful life is assigned for a typical belt that operates during typical ambient conditions and under typical driving conditions of the vehicle. Extreme ambient conditions, such as hot or cold ambient temperatures, and extreme driving conditions, such as high speed and torque use areas of vehicle driving, are known to reduce the useful life of the belt. While the useful life is assigned as a safeguard to protect a typical driver from experiencing a damaged belt, belts employed in vehicles that operate during these extreme ambient conditions and/or extreme driving conditions may experience an actual end of life of the belt being attained before the predetermined condition associated with the assigned useful life is reached.

SUMMARY

A control module-implemented method for estimating an end of life of a belt transferring torque between at least two rotating members of a belt drive system includes monitoring a plurality of belt parameters during a life cycle of the belt and determining an instantaneous damage factor of the belt based on the plurality of belt parameters. The end of life of the belt is estimated based on the instantaneous damage factor.

BRIEF DESCRIPTION OF THE DRAWINGS

One or more embodiments will now be described, by way of example, with reference to the accompanying drawings, in which.

DETAILED DESCRIPTION

Figure 1:
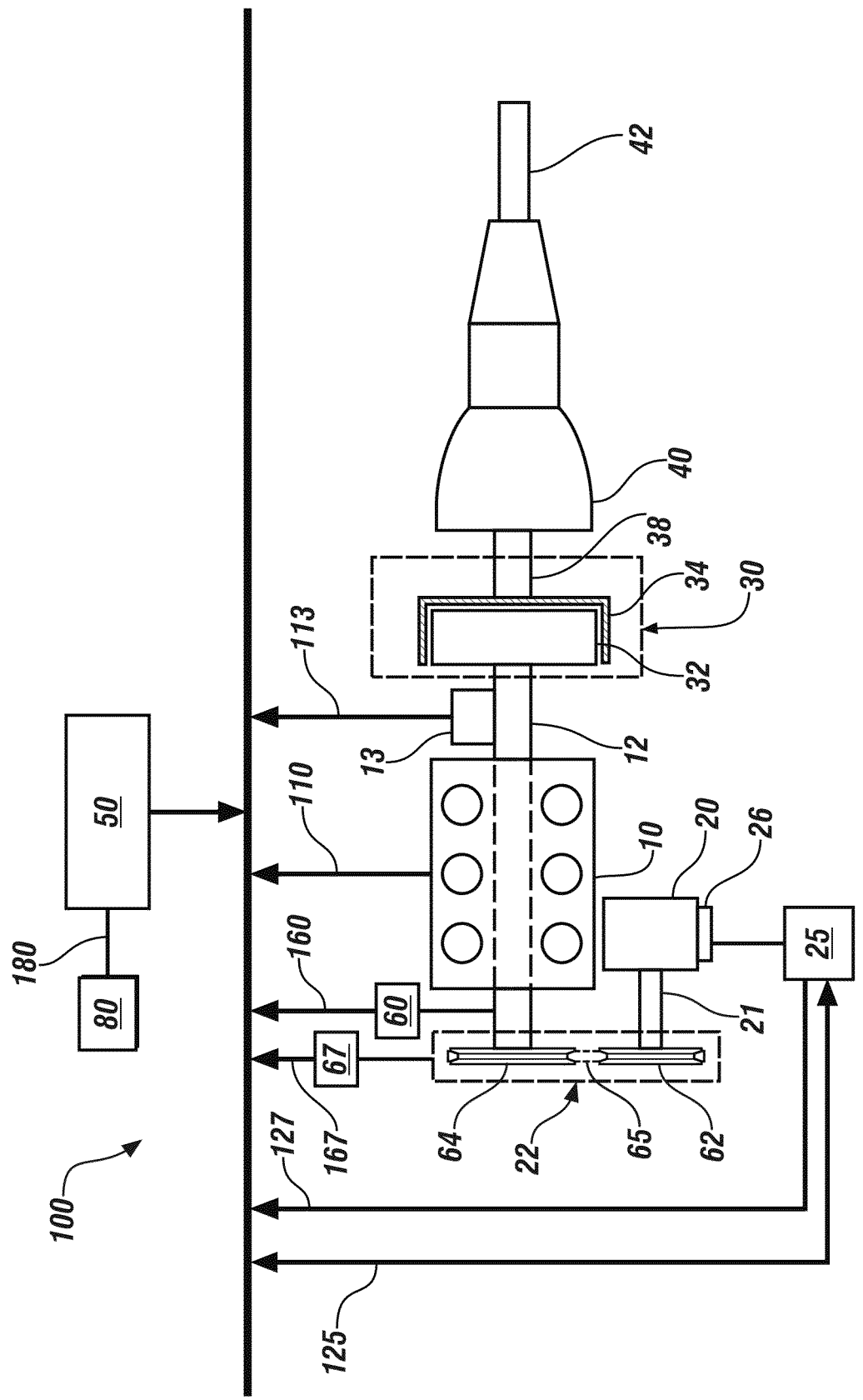
FIG. 1 illustrates a hybrid powertrain system including an internal combustion engine, an electric machine, and a transmission device configured to transfer torque to a driveline, in accordance with the present disclosure.

Referring now to the drawings, wherein the showings are for the purpose of illustrating certain exemplary embodiments only and not for the purpose of limiting the same, FIG. 1 illustrates an exemplary hybrid powertrain system 100 including an internal combustion engine 10, an electric machine 20, and a transmission device 40 configured to transfer torque to a driveline 42 including one or more drive wheels. The electric machine 20 can be a multi-phase electric motor/generator device that electrically connects to a high-voltage energy storage device (ESD) 25 via an electric power inverter 26. The electric power inverter 26 may be integrated with the electric machine 20 and operative to convert direct current provided by the ESD 25 to alternating current needed to power the electric machine 20 when operative as a motor. When the electric machine 20 is operative as a generator the electric power inverter 26 converts alternating current from the electric machine 20 to direct current for storage within the ESD 25.

The engine 10 includes a crankshaft 12 that extends beyond each end of the engine 10. The first end of the crankshaft 12 is rotatably coupled to the electric machine 20 by a mechanical coupler 22 that includes a belt drive system wherein a belt 65 engages with a pulley 62 and tensioner connected to rotate with a shaft 21 of the electric machine 20 and with a pulley 64 and tensioner connected to rotate with the first end of the crankshaft 12. Specific engine operating conditions of concern may include operating the electric machine 20 to spin and crank the engine 10 during engine starting events that include key-on engine starting events and engine autostart events during ongoing powertrain operation. As used herein, the term "key-on engine starting event" refers to the engine being started for the first time after the engine has stopped and been un-fueled for an extended period of time. For instance, key-on engine starting events may be initiated by a vehicle operator inserting a key into the ignition and turning the key to a key-crank position or electronically by the vehicle operator activating a crank button when in proximity to the ignition. As used herein, the term "engine autostart events" refers to the engine being started after the engine has been momentarily stopped and unfueled by an electronic controller under specific driving conditions, such as when the vehicle is stopped at a stop light and a brake pedal is depressed. In the illustrated embodiment, the hybrid powertrain system 100 is arranged in a belt-alternator-starter (BAS) configuration.

The second end of the crankshaft 12 rotatably couples to a torque converter 30 that rotatably couples to a transmission input member 38 of the transmission 40. The torque converter 30 may be any suitable torque converter device and preferably includes an impeller 32 and corresponding turbine 34. The torque converter 30 may include a controllable torque converter clutch that locks rotations of the impeller 32 and the turbine 34.

The transmission 40 includes a plurality of meshingly engaged gear elements selectively operative between a plurality of fixed gear ratios through activation of one or more torque-transfer devices. In one embodiment, the one or more torque-transfer devices include hydraulic clutch devices. The fixed gear ratios allow torque flows from the input member 38 to the driveline 42 to propel the vehicle. It will be understood that the driveline 42 is operatively connected to a pair of rear or front wheels.

A control module 50 includes a processing device. The control module 50 further includes one or more memory units each associated with one or more databases for storing information. At the processing device of the control module 50, ambient temperature via signal 160 (hereinafter "ambient temperature 160") is monitored, an ESD temperature signal 127 (hereinafter "ESD temperature 127) is monitored, and an engine temperature via signal 110 (hereinafter "engine temperature 110") is monitored. It will be appreciated that this disclosure is not limited to any one method for obtaining the ambient, ESD, and engine temperatures 160, 127 and 110, respectively. For instance, the ambient temperature can be obtained from a temperature sensor 60 located proximate to the powertrain 100. The ESD temperature 127 refers to an internal temperature of the ESD 25 based on measured and/or calculated temperatures of a plurality of cells within the ESD 25. In one embodiment, the monitored engine temperature 110 can be based upon measuring coolant temperature of the engine 10 as a function of the ambient temperature 160. In another embodiment, the monitored engine temperature 110 can be based upon measuring a surface temperature of the engine 10. An operator input 180 from an interface module 80 can further be monitored at the processing device of the control module 50. The operator input 180 can include an operator torque request in response to an operator input to a brake or accelerator pedal. The operator input 180 can further include a selected gear state of the transmission 40 based on a user input to PRNDL lever. Rotational speed of the crankshaft 12 of the engine 10 via signal 113 (hereinafter "crankshaft speed 113") is further monitored at the processing device of the control module 50. In the illustrated embodiment, the crankshaft speed 113 is obtained by a sensor 13 configured to monitor the rotational speed (RPM) of the crankshaft 12; however, embodiments herein are not limited to any one method for obtaining the crankshaft speed 113.

Control module, module, control, controller, control unit, processor, processing device and similar terms mean any one or various combinations of one or more of Application Specific Integrated Circuit(s) (ASIC), electronic circuit(s), processing device(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit (e.g., processing device), and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The engine 10 is capable of performing autostop and autostart events during a drive cycle. For instance, the engine 10 can be stopped and un-fueled (i.e., a fuel cut-off event) when the vehicle is stopped and the operator has the brake pedal depressed. Similarly, the engine 10 may be stopped and un-fueled when the vehicle is traveling on a downgrade that exceeds a threshold. When conditions become present requiring the engine to be running and fueled, the autostart event can be performed to start the engine 10. For instance, the autostart event can occur once an operator releases a brake pedal when the vehicle is stopped. It will be appreciated that the autostart event is not limited to any specific type of autostart event, and can include non-driver induced autostart events that are not a result of the operator input 180. The engine 10 is started by receiving torque from the electric machine 20 via the belt 65 of the coupler device 22 to spin the crankshaft 12 of the engine 10.

In the illustrated embodiment, the belt 65 is configured to transfer torque between two rotating members, e.g., pulleys 62 and 64, associated with the electric machine 20 and the engine 10, respectively. However, described in further detail below with reference to the non-limiting exemplary belt drive system of FIG. 2, embodiments herein may additionally include the belt 65 additionally transferring torque among one or more accessory components of the hybrid powertrain system 100 of FIG. 1 utilizing torque provided by the crankshaft 12 and/or motor shaft 21. Accordingly, the belt 65 can be configured to transfer torque between more than two rotating members. Moreover, embodiments may further include one or more additional belts transferring torque directly off of the crankshaft 12 of the engine 10 to drive one or more accessory components.

Exemplary embodiments herein are further directed toward monitoring a plurality of belt parameters at the processing device of the control module 50. The plurality of belt parameters includes a rotational velocity of the belt, load data of the belt and a temperature of the belt. Each of the belt parameters includes a corresponding instantaneous value obtained and monitored at the processing device of the control module 50 during the life cycle of the belt 65. Based upon the plurality of monitored belt parameters, an instantaneous damage factor of the belt 65 may be determined at the processing device of the control module 50 and utilized to determine a belt life indicator. As used herein, the term "belt life indicator" refers to a value indicating a remaining operating life of the belt 65. When the belt life indicator indicates there is no remaining operating life, e.g., the belt has reached an end of life, the belt 65 is required to be replaced or serviced. Accordingly, the end of life of the belt 65 may be estimated at the processing device of the control module 50 when the belt life indicator achieves a predetermined life threshold. Moreover, a number of elapsed revolutions of the belt, a distance traversed by the vehicle and/or an elapsed operating time until the end of life of the belt can be estimated at the processing device of the control module 50 using the belt life indicator.

In an exemplary embodiment, a number of revolutions of the belt may not be directly monitored, but may be determined at the processing device of control module 50 based on a relationship between engine revolutions and belt rotations. Engine revolutions may be monitored by a crank sensor. A ratio of belt rotations to engine crank rotations can be determined by comparing the belt length to the circumference of the engine crank. Engine revolutions may then be converted to belt rotations by applying the determined ratio. Alternatively, the number of revolutions of the belt may be monitored directly.

In an exemplary embodiment, the temperature of the belt (hereinafter "belt temperature") can be indicative of an estimated belt temperature when the belt is running. For instance, the belt temperature may be estimated at the processing device of the control module based upon the monitored engine and ambient temperatures 113, 160 respectively. It will be appreciated that embodiments herein are not limited to any one method for estimating the belt temperature and can be based upon any combination of ambient temperature, output torque of the electric machine, output torque of one or more accessory components of the belt drive system, the crankshaft speed 113, the engine temperature 110, shutter position restricting airflow into the engine, under-hood temperature, pulley/idler temperature, radiator discharge temperature and vehicle speed. In another exemplary embodiment, the belt temperature is indicative of an actual belt temperature when the belt is running obtained at the processing device of the control module 50 via signal 167. For instance, an optional temperature measuring device 67 located proximate to the powertrain 100 can be utilized to measure the temperature of the belt 65 and transmit the signal 167 to the control module 50. In a non-limiting example, the optional temperature measuring device 67 includes an infrared sensor configured to project an infrared beam upon a surface of the belt 65 which generates an electrical signal proportional to the radiation on the surface of the belt 65 that is transformed to the actual belt temperature. In another non-limiting example, the optional temperature measuring device 67 includes a thermal imaging device configured to capture an image of the belt and measure the temperature therefrom. It will be understood that this disclosure is not limited to the belt temperature being indicative of either one of the estimated belt temperature or the actual belt temperature. Some embodiments may include an average or other combination of both actual and estimated belt temperatures to obtain a more robust belt temperature.

The rotational velocity of the belt (interchangeably referred to as "belt speed") can be obtained and monitored at the processing device of the control module 50 based on the crankshaft speed 113, radii of all pulleys supporting movement of the belt, belt type, and a length of the belt. The radii of the pulleys, the belt type and the belt length can be stored in a database associated with a memory unit of the control module 50 and retrieved by the processing device. The radii of pulleys supporting movement of the belt can vary to achieve a desired mechanical advantage. It is understood that movement of the belt is supported along the circumferences of the pulleys. In the illustrated embodiment, pulleys 62 and 64 each include a respective radius and support movement of the belt 65 along the corresponding circumferences allowing mechanical power, torque and speed to be transmitted across the pulleys 62 and 64. Described in further detail with reference to the non-limiting belt drive system configuration of FIG. 2, one or more additional pulleys may be utilized to support the belt 65 for driving one or more accessory components with torque provided by the engine 12 and/or electric machine 20. Idler pulleys may additionally be utilized to support movement of the belt 65. The length of the belt 65 and the radii of all pulleys supporting movement of the belt 65 may be stored in the database of the control module 50.

The load data of the belt can be indicative of tension of the belt (hereinafter "belt tension") in some embodiments. In other embodiments, the load data of the belt can be indicative of shear stress at the belt. The belt tension and the shear stress at the belt can be obtained and monitored at the processing device of the control module 50. In embodiments when the load data is indicative of belt tension, the belt tension can include both static tension and dynamic tension. As used herein, the term "static tension" refers to load equating to stress of the belt between adjacent pulleys supporting the belt 65 in the direction of belt travel. The static tension between each pair of adjacent pulleys may be adjustable utilizing one or more tensioners based on desired operating belt speeds, belt characteristics, belt length and radii of the pulleys supporting the belt. In some embodiments, it may be desirable to adjust the static tension between adjacent pulleys to a lowest magnitude of tension that does not result in the belt slipping off of the circumference of the pulleys during high loads. As used herein, the term "dynamic tension" refers to centripetal loads exerted upon the belt based on torque provided by one or more rotating members attached to corresponding ones of the rotating pulleys supporting the belt. For instance, the pulley 62 rotatably coupled to the shaft 21 of the electric machine 20 exerts an increased load upon the belt 65 when transferring torque from the electric machine 20 for spinning and cranking the engine 10 during a start event. Likewise, utilizing the engine 10 to drive an accessory component such as an air conditioning compressor device will exert an increased load upon the belt 65 when transferring torque from the engine 10 for driving the air conditioning compressor device. These dynamic increased loads upon the belt 65 increase the belt tension. Accordingly, it is appreciated that tension of the belt is both "static" and "dynamic" because torque transferred between components of the exemplary hybrid powertrain system 100 of FIG. 1 is continuously changing during ongoing operation of the powertrain system 100.

Figure 2:
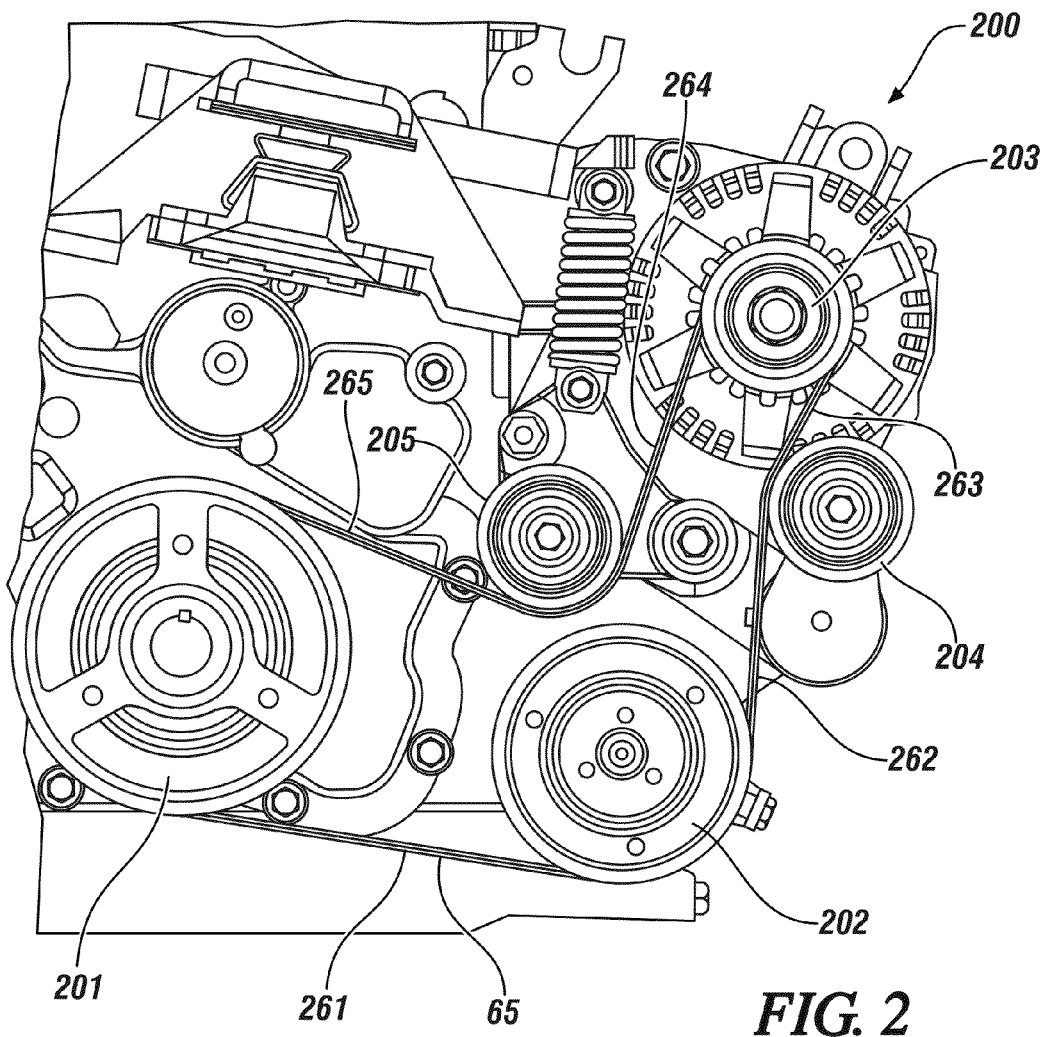
FIG. 2 illustrates a non-limiting exemplary configuration of a belt drive system of the hybrid powertrain system 100 of FIG. 1, in accordance with the present disclosure.

FIG. 2 illustrates a non-limiting exemplary configuration of a belt drive system of the hybrid powertrain system 100 of FIG. 1, in accordance with the present disclosure. The belt drive system 200 in the non-limiting exemplary embodiment transfers torque between components of the hybrid powertrain system 100 of FIG. 1 that provide and/or consume torque. These components that provide and/or consume torque include the engine 10, the electric machine 20, and one or more accessory components. The belt configuration in the illustrated embodiments is serpentine. Thus, power transmission belt 65 would ordinarily be of the v-ribbed type. However, the present disclosure may include any belt type or may include a band, cord or tape in place of a belt.

While specific components in specific geometrical arrangements are depicted in the non-limiting exemplary configuration of the belt drive system 200 in FIG. 2, it will be appreciated that the present disclosure applies to various numbers and combinations of components and geometrical arrangements, including both serpentine and non-serpentine belt configurations, depending upon application. Additionally, some belt drive systems may include two or more power transmission belts. Moreover, the present disclosure equally applies to exemplary belt drive systems employed in conventional powertrains for any type of vehicle as well as belt drive systems employed in stationary systems used in industries such as, but not limited to, construction and power plants.

In the illustrated non-limiting embodiment of FIG. 2, the belt drive system 200 includes crankshaft pulley 201, air conditioning (AC) pulley 202, electric machine pulley 203, back-side idler pulleys 204 and 205. Movement of the power transmission belt 65, in both a first direction and an opposite second direction, is supported along the circumferences of the pulleys 201-205. Exemplary belt drive systems employing additional accessory components such as, but not limited to, a water pump device and corresponding pulley are envisioned. Exemplary belt drive systems employing mechanical and/or hydraulic spring tensioner pulleys are envisioned. In one embodiment, the engine 10 when ON and spinning may provide torque via the crankshaft pulley 201 that is consumed by an AC compressor device via AC pulley 202. The engine may additionally provide torque via crankshaft pulley 201 to the electric machine 20 via electric machine pulley 203 during periods of regeneration. In another embodiment, the electric machine 20 may provide torque via electric machine pulley 203 that is consumed by the AC compressor device via AC pulley 202 when the engine is OFF and un-fueled. The electric machine 20 may additionally provide torque via electric machine pulley 203 to the engine 10 via crankshaft pulley 201 for starting the engine.

The power transmission belt 65 is divided into a plurality of spans 261-265, each having a respective magnitude of tension (N). A first span 261 includes the distance beginning with a termination at the last point of contact between the crankshaft pulley 201 and power transmission belt 65, and ending with a termination at the first point of contact between AC pulley 202 and power transmission belt 65.

A second span 262 includes the distance beginning with a termination at the last point of contact between the AC pulley 202 and the power transmission belt 65, and ending with a termination at the first point of contact between the back-side idler pulley 204 and the power transmission belt 65.

A third span 263 includes the distance beginning with a termination at the last point of contact between the back-side idler pulley 204 and the power transmission belt 65, and ending with a termination at the first point of contact between the electric machine pulley 203 and the power transmission belt 65.

A fourth span 264 includes the distance beginning with a termination at the last point of contact between the electric machine pulley 203 and power transmission belt 65, and ending with a termination at the first point of contact between the back-side idler pulley 205 and power transmission belt 65.

Lastly, a fifth span 265 includes the distance beginning at the last point of contact between back-side idler pulley 205 and power transmission belt 65, and ending with a termination at the first point of contact between the crankshaft pulley 201 and the power transmission belt 65. The magnitude of tension for each of the spans 261-265 may be stored in a database of the control module 50 and obtained and monitored by the processing device of the control module 50.

A plurality of tension spans, each having a respective magnitude of tension (N), can be determined for the power transmission belt 65 based upon the spans 261-265. Each tension span is between a corresponding pair of primary pulleys adjacent to one another in the direction of belt travel. As used herein, the term "primary pulley" refers only to pulleys corresponding to components that at least one of provide and consume torque. In the illustrated embodiment, the crankshaft pulley 201, the AC pulley 202, and the electric machine pulley 203 are primary pulleys. Primary pulleys never include idler or tensioner pulleys. Accordingly, each tension span includes respective spans 261-265 that intervene between each corresponding pair of primary pulleys adjacent to one another in the direction of belt travel. Therefore, at the processing device of the control module 50, the respective magnitude of tension for each of the tension spans can be obtained and determined based on a sum of the respective magnitude of tension for each of the plurality of spans that intervene between each corresponding pair of primary pulleys adjacent to one another in the direction of belt travel.

In the illustrated embodiment of FIG. 2, three tension spans each having a respective magnitude of tension exist. The first tension span includes the magnitude of tension for the first span 261 between the crankshaft pulley 201 and the AC pulley 202, wherein the corresponding pair of primary pulleys adjacent to one another in the direction of belt travel includes the crankshaft pulley 201 and the AC pulley 202. The second tension span includes a magnitude of tension based on a sum of the magnitude of tension for each of the second and third spans 262 and 263, respectively, intervening between the AC pulley 202 and the electric machine pulley 203, wherein the corresponding pair of primary pulleys adjacent to one another in the direction of belt travel includes the AC pulley 202 and the electric machine pulley 203. The third tension span includes a magnitude of tension based on a sum of tension for the fourth span 264 and the fifth span 265 intervening between the electric machine pulley 203 and the crankshaft pulley 201, wherein the corresponding pair of primary pulleys adjacent to one another in the direction of belt travel includes the electric machine pulley 203 and the crankshaft pulley 201.

In the embodiments when the load data of the belt is indicative of belt tension, the belt tension corresponds to a maximum belt tension determined at the processing device of the control module 50 based on the tension span of the power transmission belt 65 having the highest magnitude of tension. Generally, and regardless of the operating mode of the hybrid powertrain system, if it were assumed that each of the pulleys 201-205 were allowed to rotate freely, tension on every span would be at static tension. In the illustrated embodiment, the static tension upon the power transmission belt 65 is adjustable by the positioning of the spring tensioner pulley 205. However, changes in torque requirements for components of the hybrid powertrain system 100 and changes in rotational velocity of the power transmission belt 65 can result in the static tension on each span of the belt 65 to now include dynamic tension as a result of modifications in torque being provided or consumed by the components of the hybrid powertrain system and changes in rotational velocity of the power transmission belt 65. Modifications in torque and rotational velocity of the belt 65 can be prompted by transients in the operating mode of the powertrain and/or transients in an operator torque request and/or transients in operation of accessory components of the powertrain. As used herein, the term "operating mode of the powertrain" can refer to a regeneration mode, an electric vehicle mode, a continuously variable mode, a fixed gear mode, a motor assist mode, a coasting mode, and an engine starting mode. In the illustrated embodiment, the magnitude of tension for each of the first, second and third tension spans are dynamic, and thus, continuously modified during operation of the hybrid powertrain system.

Fundamental design considerations for the belt drive system 22 of FIG. 1 include (1) belt width denoted by a number of ribs extending in a longitudinal direction of the belt 65 and belt type selection related to torque anticipated to be supplied and consumed by components of the hybrid powertrain system 100; and (2) static tension selection to reduce stresses that reduce the useful life of the belt while not causing slippage of the belt to occur. Further, belt type and width selection affects the useful life of the belt. Also, there is interplay between these two fundamental design considerations.

Often, power transmission belts of belt drive systems are assigned a useful life based on typical ambient conditions and typical vehicle driving conditions. As used herein, the term "useful life" refers to a range of duty cycles for the belt from a beginning of life whereat the belt has sufficient operating capacities for transferring torque between components of a belt drive system. For instance, a belt at the beginning of life has an operating capacity of 100%. The terms "useful life" and "operating life" will be used interchangeably herein. When the assigned useful life has lapsed, the operator of the vehicle is required to service or replace the belt. For instance, a belt at an end of the useful life (hereinafter "end of life") has an operating capacity of 0% or otherwise an operating capacity below some threshold operating capacity that is no longer sufficient for transferring torque. It will therefore be appreciated that the useful life corresponds to the number of duty cycles of a belt from a beginning of life until an end of life of the belt. Typically, the useful life that is assigned remains unchanged during the life cycle of the belt whereat the end of life of the belt occurs upon the vehicle attaining a predetermined vehicle condition. The predetermined condition can include, but is not limited to, a predetermined number of elapsed belt revolutions since the beginning of life of the belt, a predetermined distance traversed by the vehicle, or a predetermined engine operating time. As aforementioned, this useful life for the belt is assigned for a typical belt anticipated to operate under typical ambient conditions and typical driving conditions. As used herein, the term "typical ambient conditions" refers to ranges of ambient temperatures and humidity that a majority of vehicles employing the belt are expected to be exposed to. As used herein, the term "typical driving conditions" refers to vehicle speed and torque/load profiles that a majority of drivers of vehicles employing the belt are expected to demonstrate during daily driving. However, exposure of the belt to extreme ambient conditions, such as hot or cold ambient temperatures, and extreme driving conditions, such as high speed and torque use areas of vehicle driving, are known to reduce the useful life of the belt. If the belt is exposed to these extreme ambient conditions and/or extreme driving conditions, failure conditions of the belt can result in the end of life of the belt occurring prior to the assigned useful life lapsing that is predicated upon the predetermined vehicle condition being reached. Failure conditions of the belt may include, but are not limited to, rib cracking, rib-shearing and edge-cord pop-out. Magnitudes of these failure conditions can be expressed as instantaneous damage factors during ongoing operation of the belt drive system.

Figure 3:
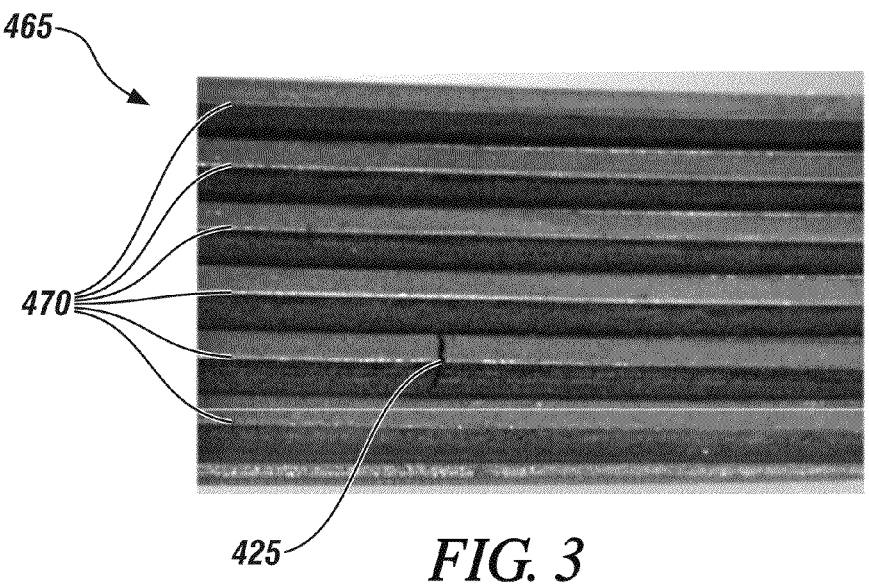
FIG. 3 illustrates a non-limiting example of a section of an exemplary power transmission belt 465 subjected to rib cracking, in accordance with the present disclosure.

FIG. 3 illustrates a non-limiting example of a section of an exemplary power transmission belt 465 subjected to rib cracking, in accordance with the present disclosure. The power transmission belt 465 includes a plurality of ribs 470 extending in a horizontal-longitudinal direction of the belt 465. The plurality of ribs 465 operate as a pulley engaging surface. In the illustrated embodiment, one of the ribs 470 is subjected to rib cracking indicated by feature 425. When one or more of the ribs 470 are subjected to rib cracking, a failure condition of the belt is present and the belt 465 may immediately, or in the near future, require replacement. In some embodiments, stress from the belt bending around pulleys at high torque leads to cracking.

Figure 4:
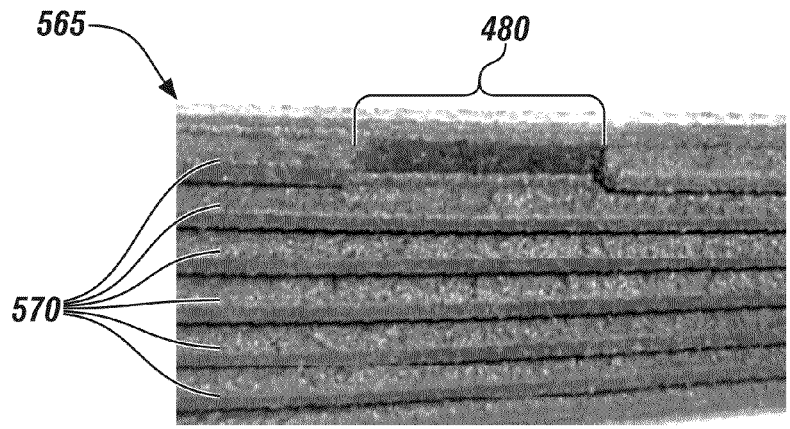
FIG. 4 illustrates a non-limiting example of a section of a power transmission belt 565 subjected to rib shearing, in accordance with the present disclosure.

FIG. 4 illustrates a non-limiting example of a section of a power transmission belt 565 subjected to rib shearing, in accordance with the present disclosure. The power transmission belt 565 includes a plurality of ribs 570 extending in a horizontal-longitudinal direction of the belt 565. In the illustrated embodiment, one of the ribs 570 is subjected to rib shearing indicated by region 480. When one or more of the ribs 570 is subjected to rib shearing, a failure condition of the belt is present and the belt 565 may immediately, or in the near future, require replacement.

Figure 5:
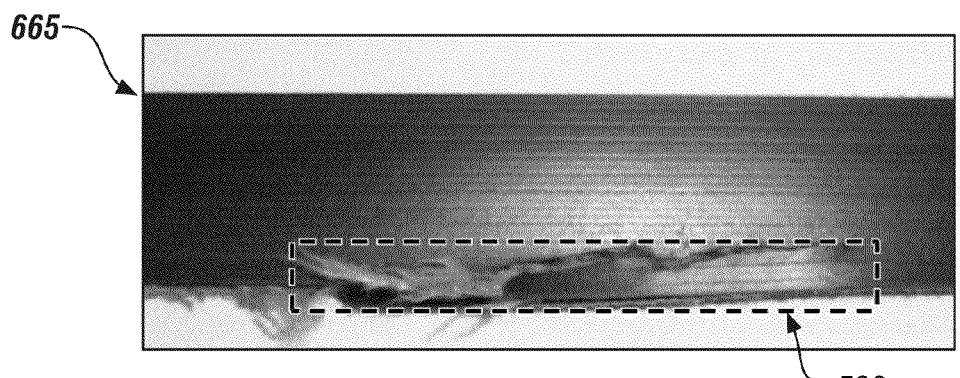
FIG. 5 illustrates a non-limiting example of a section of a power transmission belt 665 subjected to edge-core pop-out, in accordance with the present disclosure.

FIG. 5 illustrates a non-limiting example of a section of a power transmission belt 665 subjected to edge-core pop-out, in accordance with the present disclosure. In the illustrated embodiment, region indicated by dashed box 580 indicates edge-core pop-out along one of the perimeter edges of the power transmission belt 665. A failure condition of the belt 665 is present when edge-core pop-out has occurred, wherein the belt 665 immediately, or in the near future, requires replacement.

Exemplary embodiments herein are drawn upon correlations between the foregoing plurality of belt parameters and the ambient and vehicle conditions at a given time. For instance, vehicle conditions indicative of high speed and high torque values correlate to increased rotational velocity of the belt, increased load exerted upon the belt and increased temperature of the belt. Moreover, ambient conditions indicative of high temperatures result in increased belt temperatures and may further affect the load exerted upon the belt. Determined experimentally through testing and modeling, relationships depicting impacts upon the useful life of the belt can be evaluated based upon one or more of the belt parameters. Non-limiting exemplary plots of FIGS. 6-8 described in further detail below, illustrate non-limiting exemplary plots of tested and/or modeled data that depict impacts upon the useful life of the belt based upon one or more of the belt parameters. Having knowledge of how the useful life is impacted instantaneously by the plurality of belt parameters enables the end of life of the belt to be accurately estimated without the need of relying upon one of the predetermined vehicle conditions being reached when only an assigned, or otherwise static, useful life is known.

Figure 6:
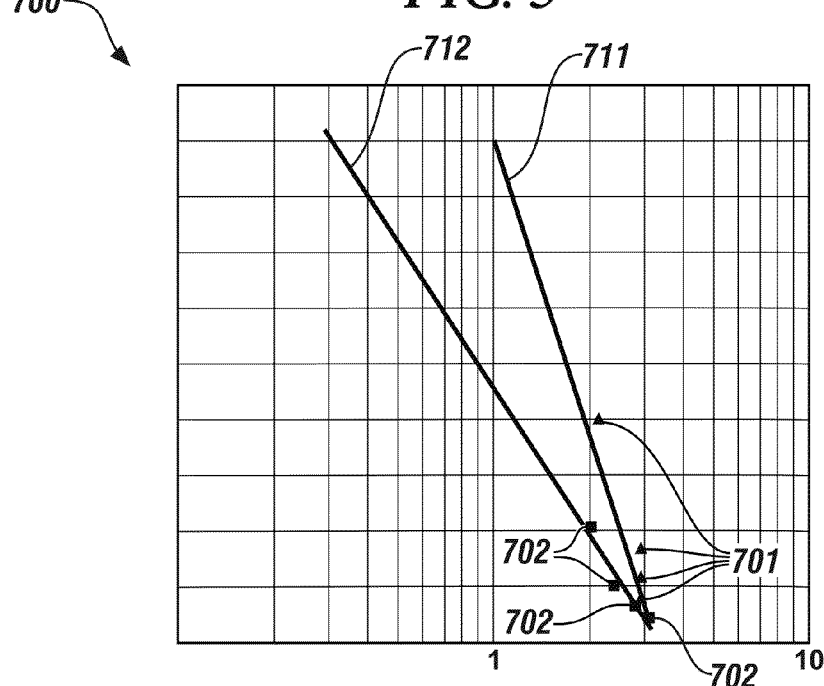
FIG. 6 illustrates a non-limiting exemplary plot 700 of experimental test data corresponding to a useful life of an exemplary power transmission belt based upon load data of the belt, in accordance with the present disclosure.

FIG. 6 illustrates a non-limiting exemplary plot 700 of experimental test data corresponding to a useful life of an exemplary power transmission belt based upon load data of the belt, in accordance with the present disclosure. In the illustrated embodiment, the exemplary power transmission belt represents the power transmission belt 65 of the powertrain system of FIG. 1 having a width denoted by a predetermined number of ribs and type selection related to torque anticipated to be provided and consumed by one or more components of the belt drive system. However, it will be appreciated that the power transmission belt can include any power transmission belt of a belt drive system transferring torque between two or more rotating components. The power transmission belt further includes predetermined static tension levels selected to reduce stresses that reduce the useful life of the belt while not causing slippage of the belt to occur. The horizontal x-axis denotes load data (N/mm-rib) increasing from zero at the origin and the vertical y-axis denotes the useful life (scaled belt revolutions) increasing from zero at the origin. In the illustrated embodiment, the number of duty cycles corresponding to the useful life is represented by belt revolutions; however, duty cycles may be similarly represented by engine operating time or distance traversed by the vehicle. It will be appreciated that the end of life occurs after the number of duty cycles corresponding to the useful life have elapsed from a beginning of life when the belt is at a capacity of 100%. It will be further appreciated that plot 700 does not take into account the impact the belt temperature has on the useful life. The impact of the belt temperature upon useful life of the belt is described below with reference to FIGS. 8 and 9.

Feature points (e.g., triangles) 701 are indicative of useful life values attributed to edge-cord pop out and corresponding load data that is indicative of the maximum belt tension (N). The maximum belt tension is expressed in terms of shear stress (N/mm-rib) based upon the predetermined number of ribs and type selection of the belt. As described above with reference to the non-limiting exemplary configuration of the belt drive system 200 of FIG. 2, the maximum belt tension is based on the tension span of the power transmission belt having the highest magnitude of tension. As aforementioned, belt tension refers to both "static tension" and "dynamic tension" which is further dependent upon rotational velocity of the belt. In one embodiment, the maximum belt tension can correlate to an instantaneous magnitude of edge-cord pop-out at the belt. Line 711 represents a logarithmic scale of the feature points 701. Described in further detail below with reference to an exemplary flowchart 1000 of FIG. 9, the logarithmic scale 711 can be utilized to generate an equation (i.e., Equation 9) for determining the useful life attributed to edge-cord pop-out normalized by the maximum belt tension. An additional logarithmic scale could similarly be illustrated representing the useful life attributed to rib-cracking.

Feature points (e.g., squares) 702 are indicative of useful life values attributed to rib shear and corresponding load data that is indicative of a magnitude of shear stress (N/mm-rib) at the belt. In some embodiments, the magnitude of shear stress at the belt can be determined based upon output torque of one or more components of the belt drive system. In a non-limiting example, the shear stress at the belt is based upon the output torque of the electric machine 20. The shear stress at the belt can correlate to an instantaneous magnitude of rib shear at the belt. Line 712 represents a logarithmic scale of the feature points 702. Described in further detail below with reference to the exemplary flowchart 1000 of FIG. 9, the logarithmic scale 712 can be utilized to generate an equation (i.e., Equation 6) for determining the useful life attributed to rib shear normalized by the monitored shear stress at the belt.

Figure 7:
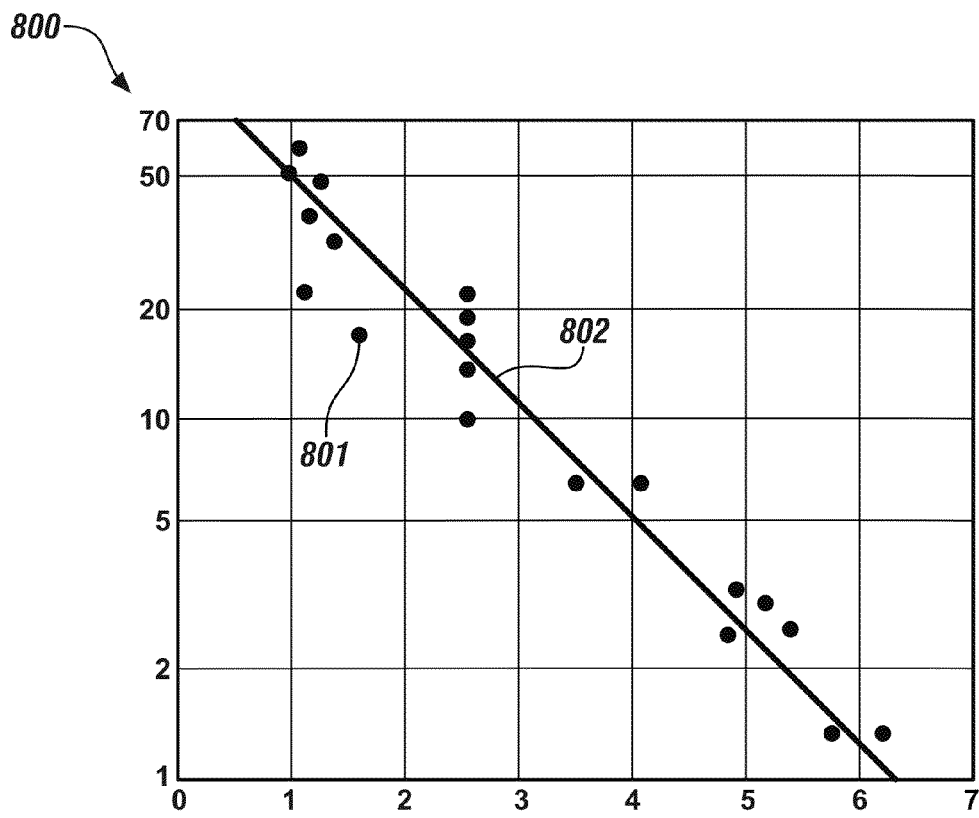
FIG. 7 illustrates a non-limiting exemplary plot 800 modeling durability of an exemplary power transmission belt versus ambient temperature, in accordance with the present disclosure.

FIG. 7 illustrates a non-limiting exemplary plot 800 modeling durability of an exemplary power transmission belt versus ambient temperature, in accordance with the present disclosure. In the illustrated embodiment, the power transmission belt represents the power transmission belt 65 of the powertrain system 100 of FIG. 1 having a width denoted by a predetermined number of ribs and type selection related to torque anticipated to be provided and consumed by one or more components of the belt drive system. However, it will be appreciated that the power transmission belt can include any power transmission belt of a belt drive system transferring torque between two or more rotating components. The horizontal x-axis denotes scaled units of ambient temperature increasing from zero at the origin and the vertical y-axis denotes the durability (scaled units of engine operating time) of the belt beginning from zero at the origin. As used herein, the term "durability of the belt" is indicative of the useful life of the belt for a give ambient temperature. Each of a plurality of feature points 801, obtained during testing, indicate a respective durability of the belt at a corresponding ambient temperature. Profile line 802 represents a logarithmic scale fitted to the plurality of feature points 801. Profile line 802 indicates that the durability of the belt is decreased by half for unit increase in ambient temperature. Thus, the durability of the belt indicative of the useful life has a half-life for every scaled unit increase in ambient temperature. For instance, an ambient temperature of 6 scaled units includes a belt durability of about 10 scaled units of engine operating time hours, whereas an ambient temperature of 8 scaled units includes a belt durability of 5 scaled units of engine operating time. It will be understood that the scaled units of engine operating time and ambient temperature represented in plot 800 can indicate various values for ambient temperature and engine operating time for representing the half-life of a selected belt. For instance, the half-life of the belt may result for every 10, 15, 20, 25 or 30° C. increase in ambient temperature depending upon the properties of the belt.

The non-limiting exemplary plot 800 of modeled durability of the belt versus ambient temperature is useful for determining the impact the belt temperature has upon the useful life of a power transmission belt. For instance, the belt temperature responds to changes in the ambient temperature. In addition to ambient temperature, the temperature of the belt may also respond to changes in any one of the following: output torque of the electric machine, output torque of one or more accessory components of the accessory drive system, the crankshaft speed 113, the engine temperature 110, shutter position restricting airflow into the engine and vehicle speed.

Figure 8:
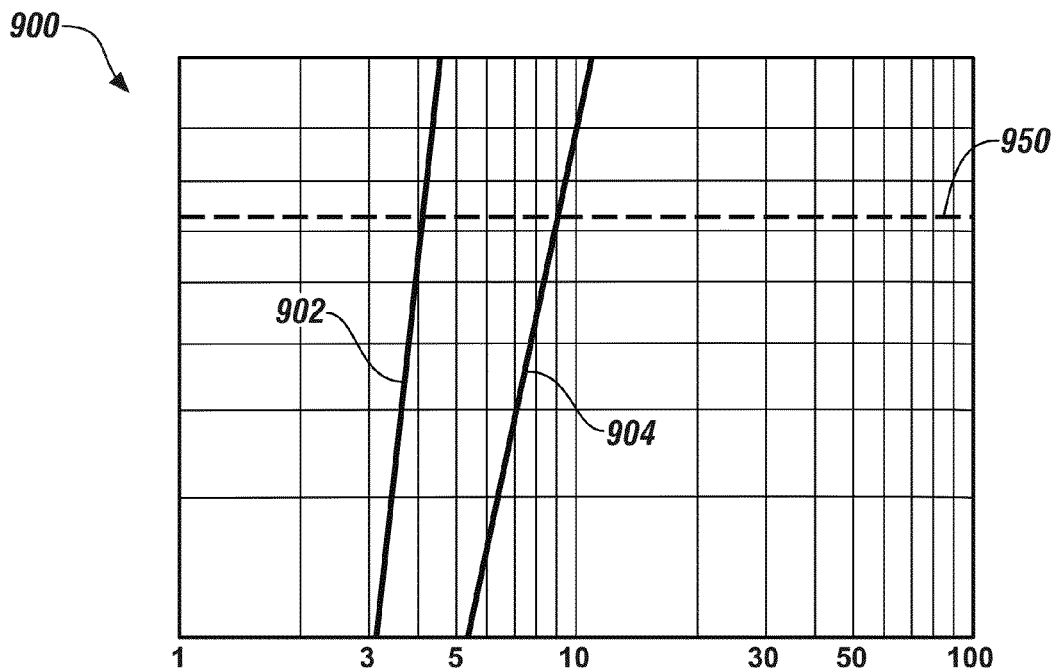
FIG. 8 illustrates a non-limiting exemplary plot 900 modeling an exemplary power transmission belt at two different belt temperatures versus a useful life of the belt, in accordance with the present disclosure.

FIG. 8 illustrates a non-limiting exemplary plot 900 modeling a power transmission belt at two different belt temperatures versus useful life of the belt, in accordance with the present disclosure. In the illustrated embodiment, the belt corresponds to the power transmission belt 65 of the powertrain system 100 of FIG. 1. The horizontal x-axis denotes useful life (e.g., scaled units of engine operating time) increasing from one (1) at the origin and the vertical y-axis denotes a cumulative distribution function (%) increasing from zero at the origin. While the number of duty cycles corresponding to the useful life is represented by scaled units of engine operating time in the illustrated embodiment, other embodiments may be similarly represented by duty cycles indicative of belt revolutions or distance traversed by the vehicle. Profile line 902 corresponds to the useful life of the belt having a belt temperature of 120° C. and profile line 904 corresponds to a useful life of the belt having a belt temperature of 100° C. It will be understood that the belt temperatures of 120 and 100° C. are selected as non-limiting belt temperatures. Dashed horizontal line 950 denotes a desired cumulative distribution function. In a non-limiting example, the desired cumulative distribution function is equal to 65%. Profile line 902 indicates a useful life of about 4 scaled units of engine operating time for the belt having the belt temperature of 120° C. at the desired cumulative distribution function 950. Profile line 904 indicates a useful life of about 8.9 scaled units of engine operating time for the belt having the belt temperature of 100° C. at the desired cumulative distribution function of 950. Thus, plot 900 illustrates that the useful life of the belt decreases for every 20° C. increase in belt temperature similar to the durability of the belt decreasing for every scaled unit increase in ambient temperature described above with reference to the non-limiting exemplary plot 800 of FIG. 7.

Figure 9:
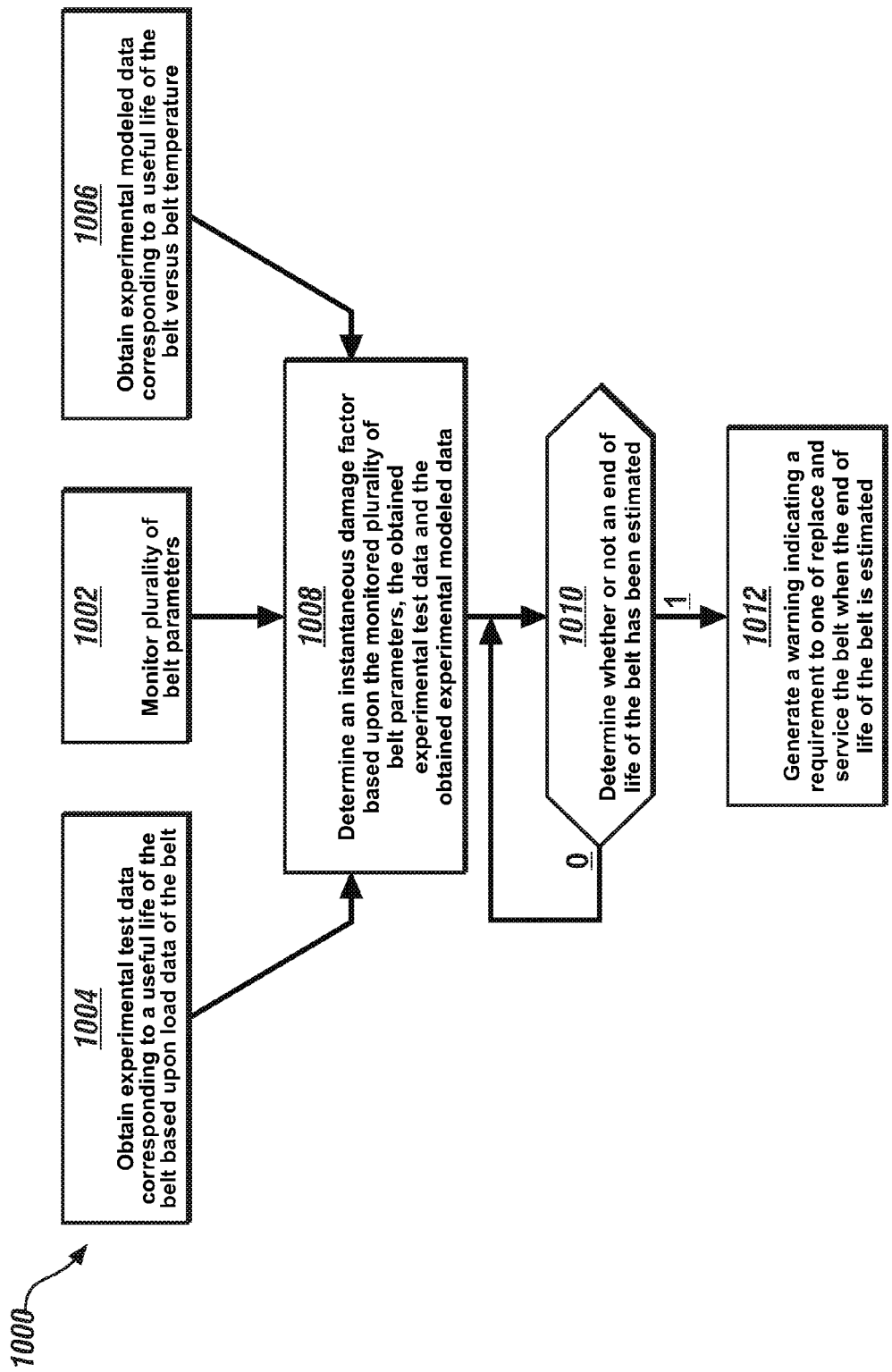
FIG. 9 illustrates an exemplary flowchart 1000 for estimating an end of life of a belt transferring torque between at least two rotating members of a belt drive system of the hybrid powertrain 100 of FIG. 1, in accordance with the present disclosure.

FIG. 9 illustrates an exemplary flowchart 1000 for estimating an end of life of a belt transferring torque between at least two rotating members of a belt drive system of the hybrid powertrain 100 of FIG. 1, in accordance with the present disclosure. However, it will be appreciated that the exemplary flowchart 1000 can be equally applied to other belt drive systems employed in any type of vehicle, farm equipment, and stationary engines. Moreover, the exemplary flowchart 1000 is not restricted to estimating the end of life of a "belt" and may equally be applied for estimating the end of life of a tape or band of any material utilized for transferring torque between at least two rotating members.

The exemplary flowchart 1000 can be implemented within the control module 50 of FIG. 1 and executed by the processing device of the control module 50. The flowchart 1000 can be described with reference to the non-limiting exemplary belt drive system 200 of FIG. 2. Table 1 is provided as a key wherein the numerically labeled blocks and the corresponding functions are set forth as follows.

Table 1 is provided as a key wherein the numerically labeled blocks and the corresponding functions are set forth as follows.

TABLE 1

| BLOCK | BLOCK CONTENTS |
|-------|----------------|
| 1002 | Monitor a plurality of belt parameters. |
| 1004 | Obtain experimental test data corresponding to a useful life of the belt based upon load data of the belt. |
| 1006 | Obtain experimental modeled data corresponding to a useful life of the belt versus belt temperature |
| 1008 | Determine an instantaneous damage factor based upon the monitored plurality of belt parameters, the obtained experimental test data and the obtained experimental modeled data. |
| 1010 | Determine whether or not an end of life of the belt has been estimated. |
| 1012 | Generate a warning indicating a requirement to one of replace and service the belt when the end of life of the belt is estimated. |

A plurality of belt parameters are each monitored at block 1002. The belt parameters are obtained and monitored at the processing device of the control module 50 of FIG. 1. The belt parameters may include a rotational speed of the belt, load data of the belt and belt temperature. The processing device further monitors a plurality of powertrain parameters and belt drive system parameters to obtain the plurality of belt parameters. In one embodiment, the plurality of powertrain parameters and the plurality of belt drive system parameters may be stored within a database of the control module 50 and retrieved by the processing device. The plurality of powertrain are selected from the group consisting of: crankshaft speed, the magnitude of tension for each span of the power transmission belt, engine operating time, and output torque of components of the powertrain system. For example, and with reference to the non-limiting exemplary belt drive system 200 of FIG. 2, the components of the belt drive system having output torque include the engine 10 (crankshaft pulley 201), A/C compressor device (A/C pulley 202), and the electric machine 20 (electric machine pulley 203). The belt drive system parameters are selected from the group consisting of: length of the belt, belt type, number of ribs, and radii for pulleys of the belt drive system supporting movement of the belt.

In some embodiments parameters can be selected from the powertrain and belt drive system parameters to detect a presence of one or more conditions that may affect one or more of the plurality of belt parameters, and thus, affect the useful life of the belt. In one embodiment, the presence of a belt slip condition can be detected based upon one or more of the powertrain and belt drive system parameters. Here, the presence of a slipping belt travelling along pulleys supporting its movement can result in belt properties such as, but not limited to, a belt friction coefficient and rib thickness to change. Thus, correlations can be made between a magnitude of detected slip and its influence on the temperature and thermal performance of the belt as well as the load data of the belt. In another embodiment, the presence of a stretched belt condition can be detected based upon one or more of the powertrain and belt drive system parameters. For instance, an increase in belt length can be estimated, whereat the stretched or increased belt length can be used to correlate an influence on the rotational speed of the belt. Moreover, increases in belt length exceeding predetermined magnitudes can indicate insufficient friction causing the belt to slip under high output torques from one or more components (e.g., electric machine 20) of the powertrain system. In another embodiment, the presence of a rapid transient belt torque condition can be detected based upon one or more of the powertrain parameters. For instance, when the belt torque rapidly alternates between torque in the negative and positive directions during short durations and at high magnitudes, correlations can be made to determine an influence upon the load data of the belt. It will be further appreciated, that while the presence of the one or more aforementioned conditions influence the belt parameters and affect the belt life, these conditions can be further analyzed to diagnose faults within the belt drive system such as faulty tensioners and overall impacts upon the life of the belt drive system such that a vehicle operator can be warned and remedial actions can be taken.

As used herein, the term "load data" of the belt can refer to the belt tension corresponding to the maximum belt tension or the magnitude of shear stress at the belt. The maximum belt tension is ultimately utilized by the processing device of the control module 50 to determine an instantaneous damage factor (or sub-factor) indicative of the magnitude of edge-cord pop-out at the belt. The maximum belt tension is based on the tension span of the power transmission belt 65 having the highest magnitude of tension, as described above with reference to the non-limiting exemplary configuration of the belt drive system 200 of FIG. 2. The magnitude of shear stress at the belt is based on the output torque of one or more components of the belt drive system. In one embodiment, the shear stress at the belt is based upon the output torque of the electric machine 20. In another embodiment, the shear stress at the belt is based upon the output torque of the A/C compressor device. In even yet another embodiment, the magnitude of shear stress at the belt is based upon a sum of the electric machine 20 and the A/C compressor device. The magnitude of shear stress at the belt is ultimately utilized by the processing device of the control module 50 to determine the instantaneous damage factor (or sub-factor) indicative of the magnitude of rib shear at the belt 65.

Referring to block 1004, experimental test data corresponding to the useful life of the belt based upon load data of the belt is obtained. The experimental test data may be stored in the database of the control module 50 and retrieved by the processing device. The experimental test data of block 1004 can include the non-limiting experimental test data described above with reference to the non-limiting exemplary plot of FIG. 6.

Referring to block 1006, experimental modeled data corresponding to a useful life of the belt based upon belt temperature is obtained. The experimental modeled data may be stored in the database of the control module 50 and retrieved by the processing device. The experimental modeled data of block 1006 can include the non-limiting experimental modeled data described above with reference to the non-limiting exemplary plots of FIGS. 7 and 8.

Block 1008 determines an instantaneous damage factor of the belt based on the plurality of belt parameters monitored at block 702, the test data obtained from block 704, and the modeled data obtained from block 706. In one embodiment, the instantaneous damage factor is indicative of a magnitude of rib shear at the belt. In another embodiment, the instantaneous damage factor is indicative of a magnitude of edge-cord pop-out at the belt. In even yet another embodiment, the instantaneous damage factor is indicative of a magnitude of rib cracking at the belt. Moreover, embodiments may additionally, or alternatively, be directed toward the instantaneous damage factor including an accumulated value indicative of a combination of at least two instantaneous damage sub-factors each indicative of a corresponding a one of the magnitude of rib shear, the magnitude of edge-cord pop-out and the magnitude of rib cracking at the belt. While instantaneous damage factors indicative of rib shear, edge-cord pop-out and rib cracking are discussed, it will be appreciated that this disclosure may include other embodiments including instantaneous damage factors indicative of other failure conditions of the belt that affect the belt's useful life.

Still referring to block 1008, the useful life of the belt is determined based upon the monitored plurality of belt parameters during an instantaneous range of duty cycles. As aforementioned, the useful life indicates a remaining number of duty cycles for the belt from the beginning of life whereat the belt has sufficient capacities for transferring torque between rotating components of the belt drive system. The processing device of the control module 50 further monitors a number of elapsed duty cycles that corresponds to the instantaneous range of duty cycles whereat the useful life of the belt is determined. Thereafter, the instantaneous damage factor can be determined based on a ratio of the number of elapsed duty cycles to the useful life. Accordingly, the instantaneous damage factor is indicative of the useful life of the belt normalized by the instantaneous range of duty cycles whereat the useful life of the belt is determined.

When the instantaneous damage factor (or sub-factor) is indicative of the magnitude of rib shear at the belt, the useful life of the belt normalized by load data indicative a magnitude of shear stress at the belt can be determined. As described above with reference to block 1002, the magnitude of shear stress at the belt is based on the output torque of one or more components of the belt drive system. The magnitude of shear stress, $\tau$, at the belt is based upon the total output torque of the components of the belt drive system and can be expressed in accordance with the following relationship:

$$\tau = F_{Applied} \div A_{MGU} \quad [1]$$

wherein
  $F_{Applied}$ is the force applied to the belt by the components of the belt drive, and
  $A_{MGU}$ is the area of the belt in contact with the electric machine pulley.

Area of the belt in contact with the electric machine pulley ($A_{MGU}$) is calculated in accordance with the following relationship:

$$A_{MGU} = S_{MGU} * N_{Ribs} \quad [2]$$

wherein
  $S_{MGU}$ is the circumference of the portion of the electric machine pulley in contact with the belt, and
  $N_{Ribs}$ is the number of ribs the belt has.
$F_{Applied}$ is calculated as follows:

$$F_{Applied} = T_{Total} \div R_{MGU} \quad [3]$$

wherein
  $T_{Total}$ is the sum of output torque applied to the belt by the components of the belt drive system, and
  $R_{MGU}$ is the radius of the electric machine pulley.
$T_{Total}$ is calculated based on the total output torque being applied to the belt by the components of the belt drive system in accordance with the following relationship:

$$T_{Total} = T_{MGU} + T_{Mom} \quad [4]$$

wherein
  $T_{MGU}$ is the output torque of one of the components,
  $T_{Mom}$ is the output torque brought on by the momentum of the electric machine pulley.
$T_{Mom}$ is calculated in accordance with the following relationship:

$$T_{Mom} = I \times \alpha \quad [5]$$

wherein
  I is the inertia of the electric machine pulley, and
  $\alpha$ is the angular deceleration of the electric machine pulley.

In one embodiment, Equation 1 is utilized to determine the magnitude of shear stress at the belt responsive to output torque of the electric machine 20, wherein the output torque, T, corresponds to the output torque of the electric machine 20 of the exemplary hybrid powertrain 100 of FIG. 1. The output torque can include a positive integer when the electric machine is providing torque to one or more components of the belt drive system 20 and the output torque can include a negative integer when the electric machine is consuming torque for charging the ESD 25. This disclosure is not limited to the magnitude of shear stress at the belt responsive to the output torque of the electric machine 20, and may include the magnitude of shear stress at the belt responsive to the output torque from any one or more components of the belt drive system capable of at least one of providing and consuming torque.

Once the magnitude of shear stress at the belt is determined using Equations 1-5, the useful life can be normalized by the magnitude of shear stress utilizing an expression derived from the experimental test data of block 1004. For instance, the expression for normalizing the useful life by the magnitude of shear stress can be obtained from the non-limiting logarithmic scale 712 of useful life values attributed to rib shear and corresponding magnitudes of shear stress at the belt, as described above with reference to the exemplary non-limiting plot 700 of FIG. 6. In a non-limiting example based on a set of experimental test data, the test data depicting the length of run until belt failure, the useful life, $UL_\tau$, of the belt normalized by the magnitude of shear stress at the belt can be determined in accordance with the following relationship:

$$UL_\tau = e^{((\tau - a)/(-b))} \quad [6]$$

wherein
  $\tau$ is the magnitude of shear stress at the belt, and
  constants a and b are determined from a regression analysis of the set of experimental test data of length of run until belt failure.

It will be understood that the type of regression analysis is dependent upon the set of experimental test data. One skilled in the art will be familiar with regression tools for best fitting the data set into an equation for use in determining useful life. The particular form of the equation may differ based upon the particular application. It will further be understood that the useful life, $UL_\tau$, calculated by Equation [6] corresponds to the useful life of the belt attributed to rib shear and is only normalized by the magnitude of shear stress at the belt without accounting for the belt temperature. Moreover, it will be appreciated that the useful life only corresponds to the magnitude of shear stress responsive to the output torque of one of the components of the belt drive system. Additional useful life values can be similarly calculated that correspond to magnitudes of shear stress responsive to the output torque of other components of the belt drive system. Described in greater detail below, the useful life can be further normalized by the belt temperature using a temperature factor prior to ultimately determining the instantaneous damage factor (or sub-factor) indicative of the magnitude of rib shear at the belt 65.

When the instantaneous damage factor (or sub-factor) is indicative of the magnitude of edge-cord pop-out at the belt, the processing device of the control module 50 determines the useful life of the belt normalized by load data indicative of the maximum belt tension (N) of the belt. The maximum belt tension calculation is based on both the static tension and dynamic tension imparted from the belt drive system onto the belt. The maximum belt tension ($T_{BeltMax}$) can be determined in accordance with the following relationship:

$$T_{BeltMax} = F_{Total} \div N_{Ribs} \quad [7]$$

wherein
    $N_{Ribs}$ is the number of ribs the belt has, and
    $F_{Total}$ is the total force applied to the belt by the components of the belt drive (static and dynamic), and can be expressed as follows:

$$F_{Total} = F_{Static} + \frac{T_{MGU}}{R_{MGU}} + \frac{T_{Mom}}{R_{MGU}} \quad [8]$$

wherein
    $F_{Static}$ is the static forces being applied to the belt;
    $T_{MGU}$ is the output torque of the electric machine pulley,
    $T_{Mom}$ is the output torque brought on by the momentum of the electric machine pulley, and
    $R_{MGU}$ is the radius of the electric machine pulley.

The useful life can be normalized by the maximum belt tension utilizing an expression derived from the experimental test data of block 1004. For instance, the expression can be obtained by the non-limiting logarithmic scale 711 of useful life values attributed to edge-cord pop-out and corresponding values of maximum belt tension, as described above with reference to the exemplary non-limiting plot 700 of FIG. 6. In a non-limiting example based on one potential set of experimental test data, the test data depicting the length of run until belt failure, the useful life, $UL_{MaxT}$, of the belt normalized by the maximum belt tension at the belt can be expressed in accordance with the following relationship:

$$UL_{MaxT} = \frac{e^{(MaxT-a)/(-b)}}{2} \quad [9]$$

wherein
    MaxT is the maximum belt tension (N), and
    constants a and b are determined from a regression analysis of the set of experimental test data of length of run until belt failure.

It will be understood that the type of regression analysis is dependent upon the set of experimental test data. One skilled in the art will be familiar with regression tools for best fitting the data set into an equation for use in determining useful life. The particular form of the equation may differ based upon the particular application. It will further be understood that the useful life, $UL_{MaxT}$, calculated by Equation [9] corresponds to the useful life of the belt attributed to edge-cord pop-out and is only normalized by the maximum belt tension without accounting for the belt temperature. Described in greater detail below, the useful life can be further normalized by the belt temperature using a temperature factor prior to ultimately determining the instantaneous damage factor (or sub-factor) indicative of the magnitude of edge-cord pop-out at the belt 65.

In addition to load data of the belt, each useful life $UL_\tau$ and $UL_{MaxT}$ determined using Equations 6 and 9, respectively, can be further normalized by the belt temperature using the aforementioned temperature factor. The temperature factor is calculated utilizing an expression derived from the relationships obtained from the experimental modeled data of block 706 corresponding to the useful life of the belt versus the belt temperature, as described above with reference to the non-limiting exemplary plots 800 and 900 of FIGS. 7 and 8, respectively. The temperature factor, TF, can be expressed as follows.

$$TF = e^{(T_b)/k_T(-h)} \quad [10]$$

wherein
    $T_b$ is the belt temperature,
    $k_T$ is a half-life factor, and
    h is a half-life constant.

It will be appreciated that the half-life factor, $k_T$, refers to the increase in temperature at which the durability of the belt is reduced in half. The half-life factor, $k_T$, can be obtained from the non-limiting experimental modeled data of FIG. 7 depicting that the useful life has a half-life for every scaled unit increase in ambient temperature. As will become apparent, the instantaneous damage factor is based upon normalizing the useful life of the belt using the temperature factor and the monitored load data of the belt. Accordingly, the temperature factor of Equation [10] can be multiplied by the result of Equation [6] to determine the useful life $UL_\tau$ of the belt attributed to rib shear normalized by the magnitude of shear stress at the belt and the belt temperature. Similarly, the temperature factor of Equation [10] can be multiplied by the result of Equation [9] to determine the useful life $UL_{MaxT}$ of the belt attributed to edge-cord pop-out normalized by the maximum belt tension and the belt temperature.

When the instantaneous damage factor (or sub-factor) is indicative of the magnitude of rib-cracking at the belt, the processing device of the control module 50 determines the useful of the belt normalized by the rotational velocity of the belt and the belt temperature. The useful life can be normalized by the rotational speed of the belt utilizing a correlation to an expected remaining number of duty cycles from a beginning of life of the belt whereat the belt is not indicative of rib-cracking. Increased rotational speeds of the belt increase the number of duty cycles and result in the magnitude of rib-cracking at the belt to occur in a shorter period of time. Accordingly, useful life values attributed to rib-cracking can be correlated to the rotational velocity of the belt. Thereafter, the temperature factor of Equation [10] can be multiplied by the result of the correlation between the useful life value attributed to rib-cracking and the rotational velocity of the belt.

Moreover, at block 1008, the number of elapsed duty cycles that corresponds to the instantaneous range of duty cycles whereat the useful life is determined must be monitored. For instance, the instantaneous range of duty cycles refers to the range of duty cycles at which the data used for determining the useful life is obtained. Thereafter, the instantaneous damage factor indicative of any combination of the magnitude of rib shear, the magnitude of edge-cord pop-out, the magnitude of rib-cracking, and any other magnitude of a failure condition at the belt can be determined based on a ratio of the number of elapsed duty cycles to the corresponding useful life.

Referring to decision block 1010, a determination is made whether or not an end of life of the belt has occurred. The processing device of the control module 50 can estimate the end of life of the belt based upon the instantaneous damage factor. In one embodiment, the end of life corresponds to a total end of life of the belt when the instantaneous damage factor includes the accumulated value indicative of the combination of at least two of the aforementioned failure conditions, whereat each failure condition among the combination includes a corresponding instantaneous damage sub-factor value. In another embodiment, the end of life attributed to each instantaneous damage sub-factor can be estimated. Accordingly, embodiments herein can include arbitrating the instantaneous damage factor or instantaneous damage sub-factors in any way to estimate the end of life of the belt.

In one embodiment, estimating the end of life of the belt based on the instantaneous damage factor includes integrating the instantaneous damage factor during the life cycle of the belt. Thereafter, an instantaneous belt life indicator can be determined by subtracting the integrated instantaneous damage factor from a value corresponding to the beginning of life of the belt. As used herein, the term "instantaneous belt life indicator" refers to a value indicative of an instantaneous remaining life of the belt. The instantaneous belt life indicator is compared to a predetermined life threshold, and when the instantaneous belt life indicator is not greater than the predetermined life threshold, the end of life of the belt is estimated.

In another embodiment, estimating the end of life of the belt based on the instantaneous damage factor includes integrating the instantaneous damage factor during the life cycle of the belt and comparing the integrated instantaneous damage factor to a predetermined damage factor. As used herein, the term "predetermined damage factor" refers to a value indicative of the end of life of the belt. This predetermined damage factor can be determined experimentally through modeling or testing. When the integrated instantaneous damage factor is at least the predetermined damage factor, the end of life of the belt can be estimated.

In even yet another embodiment, estimating the end of life of the belt based on the instantaneous damage factor includes consuming an instantaneous belt life indicator from a beginning of life of the belt using the instantaneous damage factor. In this embodiment, the instantaneous damage factor is not integrated during the life cycle of the belt, but rather, the instantaneous belt life indicator is reduced by a corresponding magnitude each time the instantaneous damage factor is determined and subtracted therefrom. It will be understood that the instantaneous belt life indicator at the beginning of life indicates that the belt has a capacity of 100% for transferring torque. The end of life of the belt can be estimated once the instantaneous belt life indicator is not greater than a predetermined life threshold. For instance, the predetermined life threshold can include a value indicative of a belt capacity of 0% or some other value indicating that the capacity of the belt is not sufficient for transferring torque.

Still referring to decision block 1010, a "0" indicates that the end of life has not been estimated, and the flowchart 1000 reverts back to block 1008. A "1" indicates that the end of life has been estimated, and the flowchart 1000 proceeds to block 1012.

At block 1012, the processing device of the control module 50 generates a warning indicating a requirement to replace and/or service the belt when the end of life of the belt has been estimated. The generated warning can be displayed upon an instrument panel of the vehicle to make the driver aware that the belt has reached the end of life. It will be appreciated that the embodiments described herein for estimating the end of life based upon the instantaneous damage factor of the belt allow for failure conditions of the belt to be diagnosed when they actually occur, as opposed to relying upon a predetermined useful life, or otherwise static useful life, for the belt that is assigned for the belt operating only under typical ambient conditions and typical driving conditions.

In one embodiment, when decision block 1010 is a "0" indicating that the end of life has not been estimated, the processing device may estimate a total remaining life of the belt until the end of life based on the instantaneous damage factor or the plurality of instantaneous damage sub-factors. For instance, the instantaneous damage sub-factors may be summed at the processing device to determine the instantaneous damage factor and the aforementioned instantaneous belt life indicator may be consumed from the beginning of life using the instantaneous damage factor. The processing device may further count a total number of duty cycles during ongoing operation of the belt drive system of the hybrid powertrain. As used herein, the term "a total number of duty cycles during ongoing operation" refers to a counting of each duty cycle completed by the belt drive system in a manner analogous to an odometer counting the distance traversed by a vehicle. In embodiments where the duty cycle includes a distance traversed by the vehicle, the total number of duty cycles during ongoing operation may be obtained by the processing device from the odometer of the vehicle. The processing device may then estimate a total remaining number of duty cycles until the end of life based upon multiplying the total number of elapsed duty cycles by the instantaneous belt life indicator. Similarly, the processing device may additionally estimate a corresponding remaining number of duty cycles until the end of life respective to each corresponding instantaneous damage sub-factor. Each of these corresponding remaining number of duty cycles until the end of life may be analyzed by the processing device to determine which of the failure conditions of the belt are consuming life the fastest such that appropriate remedial actions can be taken.

While the embodiments described above with reference to the exemplary flowchart 1000 of FIG. 9 are directed toward estimating the end of life of the belt, it will be understood that determining the instantaneous damage factor during ongoing operation of the belt drive system can be further utilized to diagnose faults within the hybrid powertrain system. In one non-limiting example, an instantaneous damage factor that increases at a faster than expected rate may be due to a faulty tensionor within the belt drive system. In this instance, the vehicle can be serviced to diagnose whether or not the tensionor is faulty, and if the tensionor is faulty, remedial action can be taken to repair/replace the faulty tensionor such that the useful life of the belt is preserved. In another non-limiting example, an instantaneous damage factor that increases at a faster than expected rate may be due to a loose pulley within the belt drive system. If a loose pulley is diagnosed after servicing the vehicle, remedial action can be taken to tighten the pulley such that the useful life of the belt is not reduced further due to the loose pulley. In another non-limiting example, back-side bump conditions can be detected based upon disturbances in the rotational speed of the belt.

Embodiments can further include integrating the instantaneous damage factor based upon the operating mode of the hybrid powertrain. An integrated instantaneous damage factor corresponding to each operating mode of the hybrid powertrain can be determined at the processing device of the control module 50 and stored within the database. Each integrated instantaneous damage factor of the corresponding operating mode of the hybrid powertrain system can be compared with the other integrated instantaneous damage factors corresponding to the other operating modes of the hybrid powertrain system. Such comparisons are helpful in determining how each operating mode of the hybrid powertrain system 100 affects the useful life of the power transmission belt. For instance, remedial action can be taken that includes limiting operation in a given operating mode known to have the greatest impact upon the useful life of the belt if the belt is nearing an end of life.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A control module-implemented method for estimating an end of life of a belt transferring torque between at least two rotating members of a belt drive system, comprising:
   monitoring in a control module a plurality of belt parameters during a life cycle of the belt;
   determining an instantaneous damage factor of the belt based on the plurality of belt parameters; and
   estimating an end of life of the belt based on the instantaneous damage factor; and
   generating a warning indicating a requirement to one of replace and service the belt when the end of life of the belt is estimated.

2. The method of claim 1, wherein monitoring the plurality of belt parameters comprises:
   monitoring rotational velocity of the belt;
   monitoring load data of the belt; and
   monitoring temperature of the belt.

3. The method of claim 1, wherein the instantaneous damage factor is indicative of a failure condition comprising a magnitude of rib shear at the belt.

4. The method of claim 1, wherein the instantaneous damage factor is indicative of a failure condition comprising a magnitude of edge-cord pop-out at the belt.

5. The method of claim 1, wherein the instantaneous damage factor is indicative of a failure condition comprising a magnitude of rib cracking at the belt.

6. The method of claim 1, wherein the instantaneous damage factor comprises an accumulated value indicative of a combination of at least two of the following failure conditions, comprising:
   a magnitude of rib shear at the belt;
   a magnitude of edge-cord pop-out at the belt; and
   a magnitude of rib cracking at the belt.

7. The method of claim 1, wherein determining the instantaneous damage factor comprises:
   determining a useful life of the belt based on the monitored plurality of belt parameters during an instantaneous range of duty cycles, the useful life indicating a remaining number of duty cycles from a beginning of life of the belt whereat the belt has sufficient capacities for transferring torque between the at least two rotating members of the belt drive system;
   monitoring a number of elapsed duty cycles corresponding to the instantaneous range of duty cycles whereat the useful life of the belt is determined; and
   determining the instantaneous damage factor based on a ratio of the number of elapsed duty cycles to the useful life.

8. The method of claim 7, wherein each duty cycle corresponds to one of the following parameters, comprising: a revolution of the belt, a distance traversed by the vehicle, and an engine operating time.

9. The method of claim 1, wherein estimating the end of life of the belt based on the instantaneous damage factor comprises:
   integrating the instantaneous damage factor during the life cycle of the belt;
   subtracting the integrated instantaneous damage factor from a value corresponding to a beginning life of the belt to determine an instantaneous belt life indicator;
   comparing the instantaneous belt life indicator to a predetermined life threshold;
   estimating the end of life of the belt when the instantaneous belt life indicator is not greater than the predetermined life threshold.

10. The method of claim 1, wherein estimating the end of life of the belt based on the instantaneous damage factor comprises:
    integrating the instantaneous damage factor during the life cycle of the belt;
    comparing the integrated instantaneous damage factor to a predetermined damage factor indicative of the end of life of the belt; and
    estimating the end of life of the belt when the integrated instantaneous damage factor is at least the predetermined damage factor.

11. The method of claim 1, wherein estimating the end of life of the belt based on the instantaneous damage factor comprises:
    consuming an instantaneous belt life indicator from a beginning of life of the belt using the instantaneous damage factor;
    comparing the instantaneous belt life indicator to a predetermined life threshold; and
    estimating the end of life of the belt when the instantaneous belt life indicator is not greater than the predetermined life threshold.

12. A control module-implemented method for estimating a total remaining life until an end of life of a belt transferring torque between at least an engine and an electric machine of a hybrid powertrain system, comprising:
    monitoring in a control module a plurality of belt parameters during a life cycle of the belt, the plurality of belt parameters comprising:
    a rotational velocity of the belt,
    load data of the belt, and
    a temperature of the belt;
    determining a plurality of instantaneous damage sub-factors of the belt based on the monitored plurality of belt parameters; and estimating the total remaining life left until the end of life of the belt based on the plurality of instantaneous damage sub-factors; and generating a warning indicating a requirement to one of replace and service the belt when the end of life of the belt is estimated.

13. The method of claim 12, wherein the rotational velocity of the belt is determined by the following steps, comprising:

obtaining a radius of each of a plurality of pulleys supporting travel of the belt stored in a database of the control module;

obtaining a length of the belt stored in the database;

monitoring engine speed; and determining the rotational velocity of the belt based on the radius of each pulley, the length of the belt, and the engine speed.

14. The method of claim 12, wherein the load data of the belt is determined by the following steps, comprising:

monitoring torque requirements of the hybrid powertrain system;

obtaining a respective magnitude of tension stored in a database of the control module for each of a plurality of tension spans of the belt based on the monitored torque requirements, each tension span comprising a respective distance beginning with a termination at a last point of contact between a corresponding primary pulley among a plurality of pulleys supporting belt movement and the belt, and ending with a termination at a first point of contact between a corresponding adjacent primary pulley among the plurality of pulleys in the direction of belt travel and the belt; and determining the load data is indicative of a maximum belt tension corresponding to the tension span of the belt having the highest magnitude of tension.

15. The method of claim 12, wherein the load data of the belt is determined by the following steps, comprising:

determining a corresponding shear stress at the belt responsive to output torque of the electric machine; and determining the load data of the belt is indicative of the corresponding shear stress at the belt responsive to the output torque of the electric machine.

16. The method of claim 12, wherein the plurality of instantaneous damage sub-factors comprises:

a first instantaneous damage sub-factor indicative of a first failure condition comprising a magnitude of rib shear at the belt;

a second instantaneous damage sub-factor indicative of a second failure condition comprising a magnitude of edge-cord pop-out at the belt; and a third instantaneous damage sub-factor indicative of a third failure condition comprising a magnitude of rib cracking at the belt.

17. The method of claim 16, wherein determining the plurality of instantaneous damage sub-factors based on the plurality of belt parameters comprises:

for each of the first, second and third instantaneous damage sub-factors:

determining a corresponding useful life of the belt based on the monitored plurality of belt parameters during an instantaneous range of duty cycles, the useful life indicating a remaining number of duty cycles from a beginning of life of the belt whereat the belt has sufficient capacities for transferring torque between the at least two rotating components of the belt drive system;

monitoring a number of elapsed duty cycles that corresponds to the instantaneous range of duty cycles whereat the corresponding useful life of the belt is determined; and determining the corresponding instantaneous damage sub-factor based on a ratio of the number of elapsed duty cycles to the corresponding useful life.

18. The method of claim 17, further comprising:

for each of the first, second and third instantaneous damage sub-factors:

consuming an instantaneous belt life indicator from a beginning of life of the belt using the corresponding instantaneous damage sub-factor;

counting a total number of duty cycles during ongoing operation of the hybrid powertrain system;

multiplying the total number of duty cycles by the instantaneous belt life indicator; and estimating a corresponding remaining number of duty cycles until the end of life respective to the corresponding instantaneous damage sub-factor based on the multiplying.

19. The method of claim 12, wherein estimating the total remaining life left until the end of life of the belt based on the plurality of instantaneous damage sub-factors comprises:

summing each of the plurality of instantaneous damage sub-factors to determine an instantaneous damage factor;

consuming an instantaneous belt life indicator from a beginning of life of the belt using the determined instantaneous damage factor;

counting a total number of duty cycles during ongoing operation of the hybrid powertrain system;

multiplying the total number of duty cycles by the instantaneous belt life indicator; and estimating a total remaining number of duty cycles until the end of life based on the multiplying.

* * * * *